United States Patent
Jackson et al.

(10) Patent No.: US 8,243,890 B2
(45) Date of Patent: *Aug. 14, 2012

(54) ALL-HTTP MULTIMEDIA MESSAGING

(75) Inventors: Kevin E. Jackson, Annapolis, MD (US); Shawn Geraghty, Annapolis, MD (US); Lewis Tuttle, Stevensville, MD (US)

(73) Assignee: TeleCommunication Systems, Inc., Annapolis, MD (US)

( * ) Notice: Subject to any disclaimer, the term of this patent is extended or adjusted under 35 U.S.C. 154(b) by 113 days.

This patent is subject to a terminal disclaimer.

(21) Appl. No.: 12/805,697

(22) Filed: Aug. 16, 2010

(65) Prior Publication Data

US 2010/0311447 A1   Dec. 9, 2010

Related U.S. Application Data

(63) Continuation of application No. 10/378,901, filed on Mar. 5, 2003, now Pat. No. 7,813,484.

(60) Provisional application No. 60/401,746, filed on Aug. 8, 2002.

(51) Int. Cl.
*H04M 11/00* (2006.01)

(52) U.S. Cl. ........... 379/88.13; 379/900; 455/412.1; 455/461; 455/466; 709/206; 709/246

(58) Field of Classification Search ....... 455/412.1–413, 455/466, 461; 709/203, 206, 217, 219, 225, 709/232, 246, 250; 370/352–356
See application file for complete search history.

(56) References Cited

U.S. PATENT DOCUMENTS

| | | | |
|---|---|---|---|
| 6,052,710 A | 4/2000 | Saliba | |
| 6,058,428 A | 5/2000 | Wang | |
| 6,128,653 A | 10/2000 | De Val | |
| 6,139,177 A | 10/2000 | Venkatraman | |
| 6,564,249 B2 | 5/2003 | Shiigi | |
| 6,665,489 B2 | 12/2003 | Collart | |
| 6,763,373 B2 | 7/2004 | Shiigi | |
| 6,801,781 B1 | 10/2004 | Provost | |
| 7,072,984 B1 | 7/2006 | Polonsky | |
| 7,243,152 B2 | 7/2007 | Guggisberg | |
| 7,269,431 B1 | 9/2007 | Gilbert | |
| 7,319,882 B2 | 1/2008 | Mendiola | |
| 2001/0042107 A1 | 11/2001 | Palm | |
| 2002/0046253 A1 | 4/2002 | Uchida | |
| 2002/0077927 A1 | 6/2002 | Lasnier | |
| 2002/0126708 A1 | 9/2002 | Skog | |
| 2002/0198999 A1 | 12/2002 | Smith | |
| 2003/0028647 A1 | 2/2003 | Grosu | |
| 2003/0069975 A1 | 4/2003 | Abjanic | |
| 2003/0172121 A1 | 9/2003 | Evans | |
| 2003/0191805 A1 | 10/2003 | Seymour | |
| 2003/0200301 A1 | 10/2003 | Trzcinko | |
| 2003/0208558 A1 | 11/2003 | Venkatraman | |

(Continued)

OTHER PUBLICATIONS

International Search Report received in PCTUS2012/00086 dated Apr. 30, 2012.

(Continued)

*Primary Examiner* — MD S Elahee

(74) *Attorney, Agent, or Firm* — William H. Bollman

(57) ABSTRACT

A WAP-free, IETF-Specification Compliant Multimedia Message Service Center (MMSC)-Multimedia Message Service (MMS) User Agent Interface based on the Hyper Text Transfer Protocol (HTTP) is provided, as well as an all-HTTP multimedia messaging technique in general, using HTTP POST and GET techniques, between mobile stations and multimedia messaging service centers (MMSCs) for multimedia message (MM) submission and delivery.

16 Claims, 2 Drawing Sheets

U.S. PATENT DOCUMENTS

| | | |
|---|---|---|
| 2003/0217291 A1 | 11/2003 | Schramm-Apple |
| 2003/0224809 A1 | 12/2003 | Savinen |
| 2003/0224811 A1 | 12/2003 | Jain |
| 2003/0234815 A1 | 12/2003 | Delaney |
| 2004/0002896 A1 | 1/2004 | Alanen |
| 2004/0203614 A1 | 10/2004 | Qu |
| 2004/0236710 A1 | 11/2004 | Clary |
| 2005/0010694 A1 | 1/2005 | Ma |
| 2008/0160954 A1 | 7/2008 | Agarwal |
| 2009/0075627 A1 | 3/2009 | Hwang |
| 2010/0009701 A1 | 1/2010 | Cai |

OTHER PUBLICATIONS

International Search Report received in PCTUS2011/002004 dated Apr. 20, 2012.

ALL-HTTP MULTIMEDIA MESSAGING

The present application is a continuation of U.S. application Ser. No. 10/378,901, entitled "ALL-HTTP Multimedia Messaging", filed on Mar. 5, 2003; now U.S. Pat. No. 7,813,484 which in turn claims priority from U.S. Provisional Application No. 60/401,746, entitled "Multimedia Messaging User. Agent Interface Based on HTTP", filed Aug. 8, 2002, the entirety of both of which are expressly incorporated herein by reference.

BACKGROUND OF THE INVENTION

1. Field of the Invention

This invention relates generally to computer and communication networks, and more specifically, to wireless carriers, wireless telecommunications, mobile phone software developers, information content delivery services and providers, multimedia messaging service (MMS), and IETF-specification compliant interfaces in general.

2. Background of Related Art

Standards for wireless multimedia messaging exist, e.g., WAP-Based MMS (www.openmobilealliance.org) and Internet Email-Based MMS (SMTP/IMAP4/POP3). Existing standards for wireless Multimedia Messaging rely on the presence of a Wireless Application Protocol (WAP) Gateway and the use of WAP encapsulation techniques in order to transfer multimedia messages between origin servers and mobile stations. The problem this creates is twofold: 1) Not all wireless service providers make use of WAP Gateways in their mobile networks and 2) Many service providers who have offered WAP-based services in the past have no desire to base their forward-looking, next generation services on WAP technologies which have proven sub-standard in the past. The creation of a wireless multimedia messaging framework that relies entirely on specifications endorsed by the Internet Engineering Task Force (IETF), the body in charge of the standardization of the public Internet, would allow wireless service providers to field MMS services that are fully Internet-standard compliant and hence WAP free. The IETF specification is explicitly incorporated herein in its entirety by reference.

Conventional systems do not provide an IETF-compliant (non-WAP) interface between mobile MMS User Agents and Multimedia Messaging Service Center servers. The state-of-the-art in this arena at present involves the use of WAP MMS specifications created by the WAP Forum to implement a non-homogeneous interface from MMSC to WAP Gateway, and then from WAP Gateway to WAP MMS User Agent. The WAP Gateway acts as a protocol converter between the HTTP interface to the MMSC (which acts as an Origin Server) and the WSP interface to the WAP MMS User Agent (which is WAP-browser based). Other Wireless Telecommunication software vendors have proposed non-WAP solutions for this interface in the past, but they have relied on Internet email protocols (SMTP, POP3, IMAP4) for multimedia message transport.

Moreover, conventional systems fail to provide an IETF-compliant (non-WAP) interface between mobile MMS User Agents and Multimedia Messaging Service Center servers. The current state-of-the-art technology, WAP-based MMS, has the following disadvantages: 1) WAP is a partially proprietary protocol and is not a truly 'global' standard, 2) Many wireless Service Providers and their subscribers have been very disillusioned with WAP-based applications in the past, focusing on WAP's poor performance and unimpressive features, 3) WAP MMS requires not only the use of a WAP Gateway installed in the Service Provider's network, but the WAP Gateway must be of the latest protocol version. Given worldwide economic conditions, many Service Providers do not wish to use their resources upgrading systems which have had little success in the past. 4) WAP solutions use message-traffic intensive protocols and couples them with additional WAP-specific overhead producing an application that uses significant bandwidth.

Some proposals in the wireless world promote the use of other non-WAP solutions for MMS. Some of these rely on Internet email protocols (SMTP, POP3, IMAP4). However, these protocols are inherently poor performers in wireless due to the "chatty", traffic-intensive nature of email transport.

SUMMARY OF THE INVENTION

In accordance with the principles of the present invention, a method and apparatus are provided for sending a multimedia message, comprising of inserting a multimedia message into an HTTP POST command. The HTTP POST command is addressed to the multimedia message database. The HTTP POST command (including the multimedia message) is transmitted via a wireless network.

In accordance with another aspect of the present invention, a method and apparatus are provided for receiving a multimedia message, comprising receiving a multimedia message Notification message. An HTTP GET command is transmitted to retrieve a multimedia message from a multimedia message database. A response to the HTTP GET command is received, including the retrieved multimedia message.

In yet another aspect, a method and apparatus for servicing multimedia message transmission and delivery comprises receiving from a first wireless device an HTTP POST command including a multimedia message intended for a second wireless device. The second wireless device is notified of the availability of a multimedia message. The notification is an HTTP GET command, which retrieves the multimedia message.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a WAP-free, IETF-Specification Compliant Multimedia Message Service Center (MMSC)-Multimedia Message Service (MMS) User Agent Interface based on the Hyper Text Transfer Protocol (HTTP). In accordance with the principles of the present invention, an All-HTTP interface is provided, using HTTP POST and GET methods, between mobile stations and multimedia messaging service centers (MMSCs) for multimedia message (MM) submission and delivery.

Figure 1:
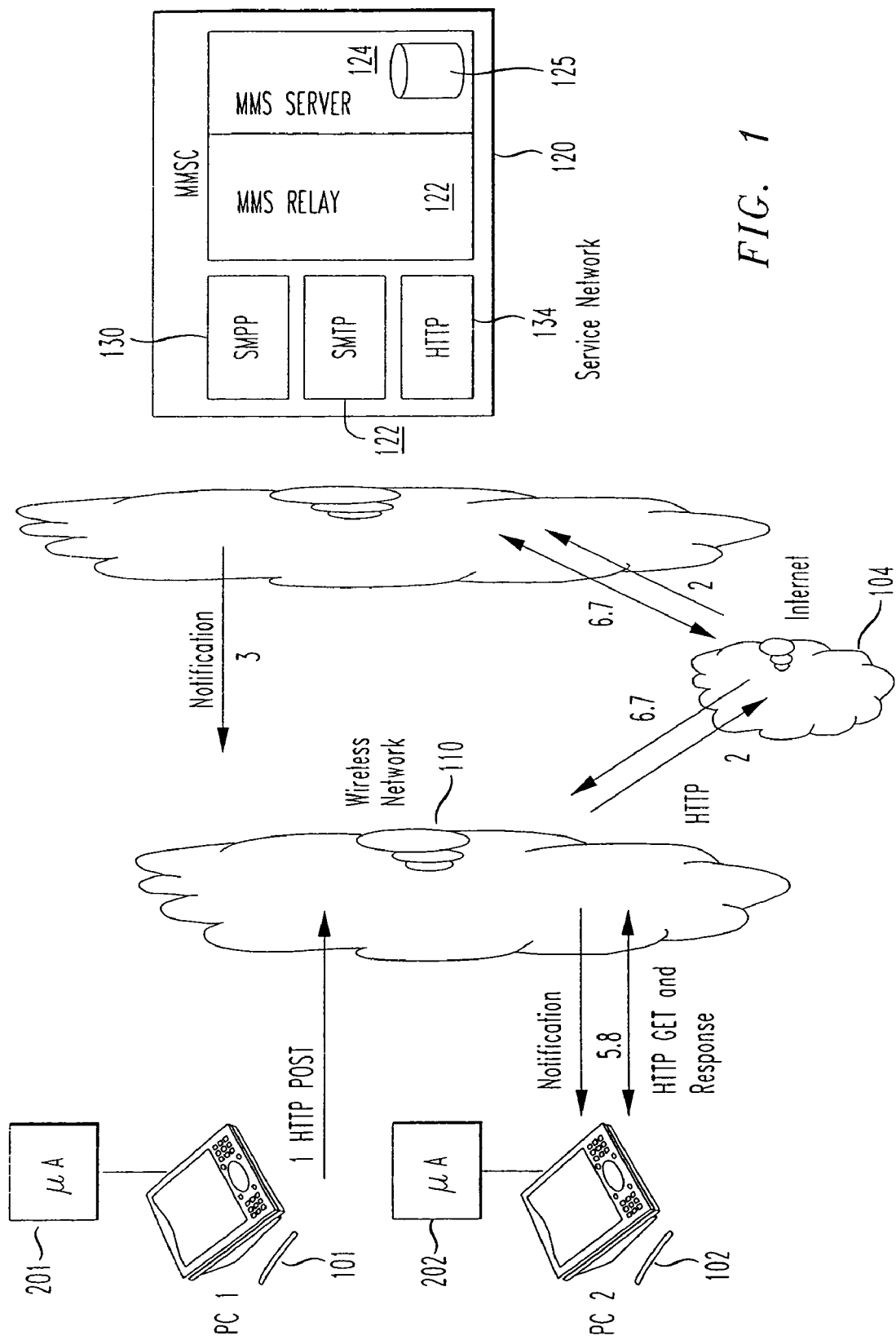
FIG. 1 shows an exemplary embodiment of an IETF-compliant MMS interface as Used for the submission of a multimedia message (MM) from a user agent (e.g., a Pocket PC) to an MMSC, and for the retrieval (download) of the same MM to a recipient's user agent (e.g., a PocketPC), in accordance with the principles of the present invention.

FIG. 1 shows an exemplary MMSC system with message flow via an IETF-compliant MMS Interface as used 1) for the submission of a multimedia message (MM) from a user agent PC 101 to a service network's MMSC 120 within a wireless network, and 2) for the retrieval (download) of the same MM to a recipient's user agent 102, in accordance with the principles of the present invention.

In the disclosed embodiment, the user agents 101, 102 are Pocket PCs. However, the end device can be any wired or wireless device that communicates (i.e., submitting a multimedia message, or getting a multimedia message) from or to the MMSC using HTTP. The description will be provided with respect to a Pocket PC embodiment.

In particular, as shown in FIG. 1, Pocket PC 1 102 and Pocket PC 2 102 each include an instance of an activated MMS User Agent (UA) 201, 202, which will be described in greater detail herein below. Each MMS User Agent (or simply "User Agent") includes an HTTP interface capable of connecting directly to the public Internet 104 via a service provider's wireless Internet access system.

Each MMS User Agent has MIME encapsulation logic within it, allowing it to send and receive MIME message bodies over the HTTP interface.

The MMSC 120 resides within a service provider's network and is connected to the public Internet 104 via an HTTP Server 134. The MMSC 120 contains a routing and validation module, termed herein an "MMS Relay" 122, and a media storage module termed herein an "MMS Server" 124, as well as several other interfaces, e.g., an SMPP interface or server 130, and an SMTP interface or server 132.

In the disclosed embodiments, the MMSC 120 includes MIME message handling facilities, enabling it to send and receive MIME message bodies over several interfaces (including HTTP).

In effect, the HTTP server 134 takes the HTTP protocol methods that are most commonly used for browsing the Internet and adapts them for use as a messaging protocol for discrete, point-to-point or point-to-multipoint MIME multimedia entity transport.

Figure 2:
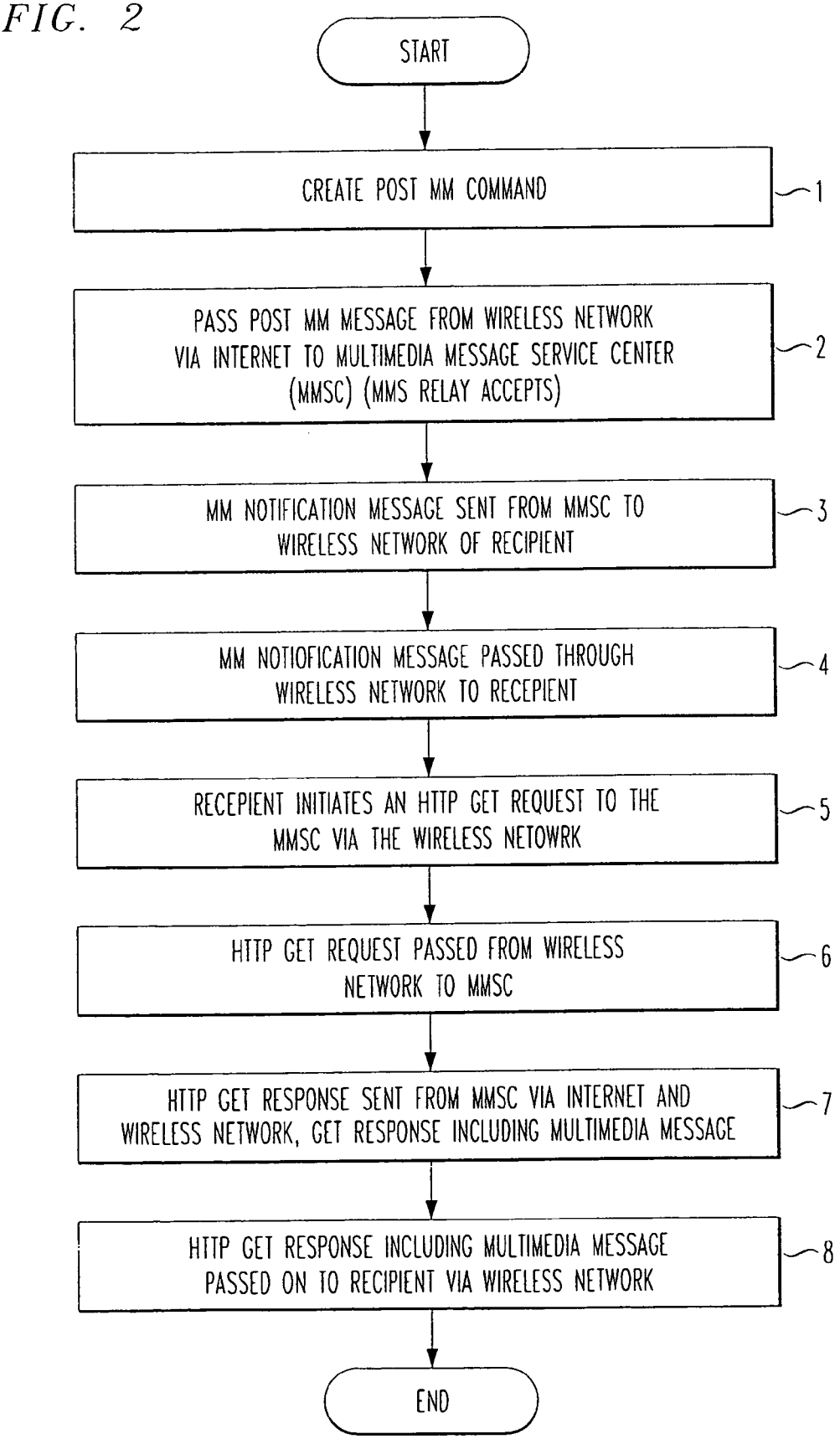
FIG. 2 shows the exemplary message flow shown in FIG. 1.

As an example, as shown in steps 1 and 2 of FIGS. 1 and 2, the MMS User Agent on pocket PC 1 101 creates a multimedia message addressed to Pocket PC 2 102. The User Agent 201 on Pocket PC 1 101 knows the IP address/URL of the serving MMSC 120 in advance. The subscriber might include message management details common to standard MMS (e.g., expiration time, earliest time of delivery, priority, etc) within the Multimedia Message via the User Agent 201. The Multimedia Message (consisting of, for example, a MOV file, a JPEG image, a WAV audio file, and/or plain text) is encapsulated as a MIME multipart message by the User Agent 201, which then uses an HTTP over TCP over wireless IP connection to POST the Multimedia Message to the MMSC 120 via the wireless network 110, and Internet 104.

The MMS Relay 122 accepts the POST command, processes the encapsulated Multimedia Message (including subscriber validation), returns the appropriate POST response (potentially with an encapsulated application layer status message as well), and stores the Multimedia Message within a message database 125 associated with the MMS Server 124.

In steps 3 and 4 of FIGS. 1 and 2, the MMSC 120 sends an appropriate Notification message to the intended recipient's User Agent 202. Multimedia Message Notification specifics are well known by those of ordinary skill in the art. The Multimedia Message Notification contains, among other things, a reference to the Multimedia Message stored in the database 125 of the MMS Server 124.

As shown in steps 5 and 6 of FIGS. 1 and 2, to download the Multimedia Message from the MMSC 120, the recipient User Agent 202 in the Pocket PC 2 102 initiates an HTTP GET request to the MMSC 120 for the Multimedia Message reference received in the Notification.

In steps 7 and 8 of FIGS. 1 and 2; a GET Response from the MMSC 120 to the User Agent 202 in the Pocket PC 2 102 then contains the Multimedia Message itself, having been retrieved from the MMS Server 124 and encapsulated within the message body of the GET response.

The User Agent 202 then interprets the MIME multipart data and allows the recipient to view/play the various components.

The all-HTTP feature of Multimedia Messaging in accordance with the principles of the present invention offers built-in extensibility for an MMSC-MMS User Agent Interface. Protocol data units encapsulated in the HTTP message bodies may be expanded and customized easily, as they are formed as plain text entities. Moreover, HTTP already has applications and sub-protocols that can be leveraged to cover the MMS-critical of Message Security (such as TLS) and Terminal Capability Negotiation (such as the X-RCAPABILITY header system).

More specific details of the MMS User Agent immediately follows, with a more specific description of the Multimedia Message Service Center (MMSC) following thereafter.

MMS User Agent (UA)

Network

The exemplary MMS User Agent client 201, 202 resides on a Compaq IPAQ Pocket PC 101, 102 equipped with a 1xRTT capable wireless access card. The IPAQ is registered with a Verizon Wireless Express Network (1xRTT Brand Name) and has an addressable MIN or IP Address for Verizon's network. Of course, other brand wireless devices, as well as other types of wireless devices and other service providers, are well within the scope of the present invention.

Settings Information

The MMS UA 201, 202 preferably includes a provisionable (e.g., through a simple graphical user interface (GUI)) MMS Address (e.g., a Pocket PC/Aircard Mobile Phone Number) field for its own MMS Address. E.g. 4103036476. This MMS Address is preferably mapped to the "From" field of an outgoing MM.

The MMS UA 201, 202 also preferably includes a provisionable (e.g., through a simple GUI) MMSC Address field for the URL of the MMSC 120. The MMSC address is preferably mapped to the "Host" address field of an outgoing MM.

The MMS UA 201, 202 preferably stores "hardcoded" values for the retrieve and submit paths to be used in HTTP communication with the MMSC 120. The submit path is preferably, e.g., "/cgi-bin/sendreq.cgi?" and the retrieve path is preferably, e.g., "/cgi-bin/retrieve.cgi?". The URL of the retrievable MM is preferably appended onto the retrieve path in GET messages.

MM Notification

The MMS User Agent 201, 202 may present a "View My Notifications" or similar option in the user interface.

The MMS User Agent 201, 202 interfaces with an SMS client that interworks with the 1xRTT wireless access cards SMS functionality.

The MMS User Agent 201, 202 monitors incoming SMS messages for conversion to MMS Notifications.

The MMS User Agent 201, 202 preferably has the ability to prevent the SMS Client from displaying the SMS Message or alerting the subscriber of a new SMS.

The MMS User Agent 201, 202 receives MM Notifications within the message body of Short Messages with the following fields. The MMS User Agent validates and parses these fields. The MMS User Agent 201, 202, in parsing the comma-delimited Short_Message field of the Submit_SM Message, recognizes the following preferred fields in the following preferred order: "Type of message" (m-not), "From" (410303476), "Subject" (World Leaders), and so on. See example 4.0 for details. Reference Table 4.0 for field details.

TABLE 1.0

MM Notification Elements

| Name | Content | Description |
| --- | --- | --- |
| Type | m-not | Specifies the transaction type. |
| From | From-value | Address of the message sender. If address hiding is supported, the MMS Relay may not add this field to the message header. |
| Priority | Priority-value | Priority of the Message, Low, Normal, or High |
| Size | Message-size-value | Full size of message in octets. |
| URL | Content-location-value | Defines the location of the message. |
| Subject | Subject-value | Subject of the message |

The MMS User Agent 201, 202 stores the MM Notification data and preferably supports the storage of multiple MM Notifications simultaneously. With multiple Notifications on the Pocket PC 101, 102, each may be displayed in a list, e.g., titled "You Have Notifications From:" allowing individual notifications to be selected. Notifications may be listed by the value in the "From" field.

The MMS User Agent 201, 202 may display the From, Subject, Message Size (in KB, though received in Octets), and Priority in a user-friendly manner, along with options to either "Retrieve Now" or "Retrieve Later". This may be within an "MMS Alert" popup window or message box upon receipt of the MM notification.

Retrieval

The MMS User Agent 201, 202 initiates a 1xRTT wireless Internet session with the Verizon Express Network, in response to a "Retrieve Now" selection by the subscriber.

The MMS User Agent 201, 202 initiates an HTTP GET Request directed to the MMSC's URL after session establishment, and after the subscribers chooses the "Retrieve Now" option. The URL is composed of the Retrieve Path hardcoded as "/cgi-bin/retrieve.cgi?" (see Section III) followed by the URL from the Notification.

Example 1.0

GET request Message for an MM at ooeygooey.telecomsys.com with URL "/cgi-bin/retrieye.cgi?r=4103036476&f=123456789012345678901234"

---

GET /cgi-bin/retrieve.cgi?r=4103036476&f=123456789012345678901234 HTTP/1.1
Host: ooeygooey.telecomsys.com

---

The MMS User Agent 201, 202 accepts MIME multipart content in the GET Response message that results.

The MMS User Agent 201, 202 may, upon receipt of the GET Response, display the image and text MIME parts that are encapsulated within it, and may display Date, From, To, Cc, Priority, and Subject fields. The image may, e.g., appear centered in the User Agent display with the text as a caption below it. If a WAV file was included, the UA 201, 202 may either play the WAV automatically or present the option to play it on command.

TABLE 2.0

MM Retrieval Elements

| Name | Content | Description |
| --- | --- | --- |
| Date | Date-value | Sending date and time. |
| From | From-value | Address of the message sender. If address hiding is supported, MMS Relay may set the 'From' field to 'Anonymous'. |
| To | To-value | Recipient address. |
| Cc | Cc-value | Recipient address. |
| Subject | Subject-value | Subject of the message. |
| X-Mms-Priority | Priority-value | Priority of the message. Default = Normal. |
| Content-Type | Content-type-value | The content type of the message. |
| Message Body | Message Body | The MIME encapsulated MM components. |

Example 2.0

GET Response MESSAGE (M-retrieve.conf)

---

HTTP/1.1 200 OK
Content-encoding: 7bit
Content-Type: text/html
Content-Length: XXX
    Date: Tue, Jun 11 2002 15:41:00 GMT
    From: 4103036476
    To:    4103036475, demo2@yahoo.com
    Cc: demo@yahoo.com
    Subject: World Leaders
    X-mms-Priority: Normal
Content-Type:
multipart/mixed;boundary=asdlfkjiurwghasf;
        --asdlfkjiurwghasf
        Content-Type: image/jpeg
        qwertyuiopasdfghjklzxcvbnmqwertyuiopasdfghjkl
        zxcvbnmqwertyuiopasdfghjklzxcvbnmqwertyuiopas
        dfghjklzxcvbnmqwertyuiopasdfghjklzxcvbnm
        --asdlfkjiurwghasf
        Content-Type: text/plain
        qwertyuiopasdfghjklzxcvbnmqwertyuiopasdfghjkl
        zxcvbnmqwertyuiopasdfghjklzxcvbnmqwertyuiopas
        dfghjklzxcvbnmqwertyuiopasdfghjklzxcvbnm
        --asdlfkjiurwghasf
        Content-Type: audio/wav
        qwertyuiopasdfghjklzxcvbnmqwertyuiopasdfghjkl
        zxcvbnmqwertyuiopasdfghjklzxcvbnmqwertyuiopas
        dfghjklzxcvbnmqwertyuiopasdfghjklzxcvbnm
        --asdlfkjiurwghasf

---

The MMS User Agent 201, 202 may, after successful retrieval, delete the related MM Notification from the notification list.

The MMS User Agent 201, 202 may, in response to a "Retrieve Later" selection by the subscriber, store the MM Notification for future "Retrieve Now" option. Whenever any MM Notification in the notification list is viewed (or highlighted, etc), the "Retrieve Now" and "Retrieve Later" options may be visible.

The MMS User Agent 201, 202 may accept an M-retrieve.err message from the MMS Relay in response to a GET request when the retrieve is not possible. The M-retrieve.err message may be encapsulated in the body of an HTTP GET Response message with an unsuccessful status.

The message format may be in the following exemplary format:

TABLE 3.0

MM Retrieve Error (M-retrieve.err message)

| Name | Content | Description |
|---|---|---|
| X-Mms-Message-Type | Message-type-value = M-Retrieve-Error | Specifies the message type. |
| X-Mms-MMS-Response-Status | Response-status-value | MMS-Specific status of the MM retrieval. |

The MMS User Agent 201, 202 may accept the following exemplary Response-Status-Values within the M-retrieve.err message: Error-unspecified, Error-service-denied, Error-message-format-corrupt, Error-message-not-found, Error-network-problem, Error-content-not-accepted, or Error-unsupported-message.

Submission

The MMS User Agent 201, 202 may present a "Send a Message" option within its user interface.

The MMS User Agent 201, 202 may, upon selection of "Send a Message", automatically initiate a 1xRTT wireless Internet session.

The MMS User Agent 201, 202 may, upon selecting the "send a message" option, present a screen or series of screens allowing the subscriber to, e.g.:

Browse the Pocket PC directories to pick an image or text file.

Access a text box for typing in a text message to accompany an image

Access a text box for entering the MMS Address or email address of the recipient MMS subscriber (as a To: field)

A text box for entering MM Subject with NO COMMAS.

A dropdown list for selecting Priority (Low, Normal, or High)

Enter a delayed delivery time

Enter an expiry time

Address Hiding Check box

Read Reply Report Request

Delivery Report Request check box

[Reference Table 5.0 for Max Length details]

The MMS User Agent 201, 202 may offer a "Send Now" option or button after all mandatory fields are entered.

The MMS User Agent 201, 202 may encapsulate the M-send.req message (below) within an HTTP POST message directed to the URL of the HTTP Server 134 of the MMSC 120. The fields below may be encoded, e.g., according to Table 1.

TABLE 4.0

MM Submission Elements (M-send.req message)

| Name | Content | Max Leng | Description |
|---|---|---|---|
| X-Mms-Message-Type | Message-type-value = M-Send-req | N/A | Specifies the transaction type. See requirements below. |
| X-Mms-Transaction-ID | Transaction-ID-value | 10 | Unique Transaction ID to identify the current submit and its response only. |
| Date | Date-value | N/A | System date and time within the Pocket PC |
| From | From-value | N/A | MMS address previously provisioned into the MMS User Agent. |
| To | To-value | 10 if MIN, unlimited if email | Recipient address. |
| Cc | Cc-value | 10 if MIN, unlimited, if email | Recipient address. |
| Subject | Subject-value | N/A | Subject of the message. Overly long subjects may be truncated during delivery. |
| X-Mms-Priority | Priority-value | N/A | Priority of the message. Low Normal High |
| Content-Type | Content-type-value | N/A | The content type of the message. Multipart/mixed for demo purposes. |
| Message Body | Message Body | N/A | Encoded Message body. |

The UA 201, 202 encodes the X-MMS-Message-Type field above with "M-send.req", and generates a unique Transaction ID value for each M-send.req message in order to properly correlate each M-send.conf confirmation message that is returned from the MMSC 120. The Transaction ID may be a text string beginning with a known string such as "TCS", followed by arbitrary text characters (e.g., seven arbitrary text characters).

For all elements in the submission message the maximum length should preferably not be exceeded.

The MMS User Agent 201, 202 copies the current Pocket PC system Date and Time into the "Date" field, and copies its own MMS Address into the "From" field above. The UA 201, 202 copies the "To" and "Cc" addresses entered by the subscriber into the "To" and "Cc" fields above. The UA 201, 202 may also accept a comma-delineated list of addresses and copy those to the respective fields above.

The UA 201, 202 copies the "Subject" text entered by the subscriber into the "Subject" field above, and copies the "Priority" option entered by the subscriber into the "Priority" field above. The UA 201, 202 enters "multipart/mixed" as the "Content Type" value above, and encapsulates the MIME-encoded message parts (image/jpeg and text/plain) into the "Message. Body" field above. See Example 3 below for an example of HTTP message encapsulation.

The UA 201, 202 copies the MMSC Address (URL) from the settings data to the "HOST" field. See example below.

The UA 201, 202 is POSTed to the hardcoded Submit path "/cgi-bin/sendreq.cgi". See Section III.

Example 3.0

HTTP Encapslulation of an M-send.req Message Formed and POSTed by the MMS User Agent

```
POST /cgi-bin/sendreq.cgi HTTP/1.1
Host: ooeygooey.telecomsys.com
Date: Sun, 16 May 2002 18:13:23 GMT
Content-encoding:7bit
Content-Type: text/plain
Content-Length: 557
    X-Mms-Message-Type: m-send-req
    Date: XXXXX
    From: 4103036476
    To: 4103036475, demo2@yahoo.com
    Cc: demo@yahoo.com
    X-Mms-Priority: Normal
    Content-Type:           multipart/mixed;
    boundary=qazwsxedcrfvtgb;
    -- qazwsxedcrfvtgb
    Content-Type: image/jpeg
    qwertyuiopasdfghjklzxcvbnmqwertyuiopasdfghjkl
    zxcvbnmqwertyuiopasdfghjklzxcvbnmqwertyuiopas
    dfghjklzxcvbnmqwertyuiopasdfghjklzxcvbnm
    -- qazwsxedcrfvtgb
    Content-Type: text/plain
    qwertyuiopasdfghjklzxcvbnmqwertyuiopasdfghjkl
    zxcvbnmqwertyuiopasdfghjklzxcvbnmqwertyuiopas
    dfghjklzxcvbnmqwertyuiopasdfghjklzxcvbnm
    -- qazwsxedcrfvtgb --
```

Submit Response

The MMS UA 201, 202 accepts an M-send.conf message encapsulated in the HTTP POST response message that is returned from the MMSC 120. The M-send.conf message may be formatted as follows:

TABLE 5.0

MM Submission Confirmation (M-send.conf message)

| Name | Content | Description |
|---|---|---|
| X-Mms-Message-Type | Message-type-value = M-Send-conf | Specifies the message type. |
| X-Mms-Transaction-ID | Transaction-id-value | A unique, 10 digit identifier (beginning with text "TCS") for the message. This transaction ID identifies the M-Send.conf and the corresponding request only. |
| X-Mms-MMS-Response-Status | Response-status-value | MMS-Specific status of the submitted MM. |

The MMS UA 201, 202 may ignore any extra fields in the M-send.conf message. Also, the MMS UA 201, 202 may expect one of the following exemplary Response-status-values in the M-send.conf message: Ok, Error-unspecified, Error-service-denied, Error-message-format-corrupt, Error-sending-address-unresolved, Error-message-not-found, Error-network-problem, Error-content-not-accepted, Or Error-unsupported-message. If an "OK" response is returned, the UA 201, 202 may display text such as "MM successfully submitted" within the GUI. All other status values may be displayed within the GUI as received.

Example 4.0

POST Response Message with M-send.conf Encapsulated

```
HTTP/1.1 200 OK
Content-encoding: 7bit
Content-Type: text/plain
Content-Length: 108
    X-Mms-Message-Type: M-send-conf
        X-Mms-Transaction-ID: TCS1234567
        X-Mms-Response-Status: error-service-denied
```

Multimedia Message Service Center (MMSC)

SMPP Interface of the MMSC

The SMPP Client 130 is preferably able to converse smoothly with the MMSC Relay, and able to receive and parse MM notification messages sent by the MMS Relay 122.

The SMPP client 130 encapsulates the M-notification.ind message fields with actual values comma delimited (as shown in Table 6.0 and illustrated in Example 5.0) within the Short_Message parameter of a Submit_SM according to Table 7.0.

The SMPP Client 130 uses the M-notification.ind message received from the MMS Relay 122 to create and send a Submit_SM Message. The Submit_SM message may be in the format shown in Table 7.0.

The maximum bytes that should be inserted into the Short_Message field of the Submit_SM Message is 106. This limitation may be exceeded to allow longer "Subject" lines, but "Subject" truncation might occur during SMS delivery.

TABLE 6.0

MM Fields renamed before insertion in the Short Message Field of the Submit SM Message

| MM Field Name | Content | Short_Message Field Sample Values | Max Length | Description |
|---|---|---|---|---|
| X-Mms-Message-Type | Message-type-value = m-notification-ind | m-not | 5 characters | Specifies the transaction type. |
| From | From-value | Examples MIN = 410303476 Email = demo@telecomsys.com | 40 characters | Address of the message sender. If address hiding is supported, the MMS Relay does not add this field to the message header. |
| Priority | Priority-value | 2 | 1 character | 1 = low, 2 = Normal, 3 = High |
| X-Mms-Message-Size | Message-size-value | 300000 | 8 characters | Full size of message in octets. |
| X-Mms-Content-Location | Content-location-value | r = 4103036476&f = [24 digit ref#] | 39 characters | Defines the location of the message. |

TABLE 6.0-continued

MM Fields renamed before insertion in the Short Message Field of the Submit SM Message

| MM Field Name | Content | Short_Message Field Sample Values | Max Length | Description |
|---|---|---|---|---|
| Subject | Subject-value | Vacation | N/A | Subject of the message with NO COMMAS. Overly long subjects may be truncated during delivery. |

Example 5.0

M-notification.ind Encoding into Short Message Parameter of Submit Sm

M-not,4102792082,2,300000,r=4103036476&f=123456789012345678901234,Vacation to Jamaica

TABLE 7.0

Submit SM Message Fields

| | Field name | Size (octet) | Type | Description |
|---|---|---|---|---|
| HEADER | Command_Length | 4 | Integer | Total Length of the PDU |
| | Command_Id | 4 | Integer | Set to 0x00000004 |
| | Command_Status | 4 | Integer | Set to 0x00000000 - OK |
| | Sequence_Number | 4 | Integer | Set to a value within the following range (0x00000001-0X7FFFFFFF) |

Mandatory Parameters

| Name | Size in Octet | Type | Description |
|---|---|---|---|
| Service_type | <=6 | C-Octet string | "CMT"—Cellular Messaging Teleservice |
| Source_addr_ton | 1 | Integer | Leave default |
| Source_addr_npi | 1 | Integer | Leave default |
| Source_address | <=21 | C-Octet string | NULL, as if address unknown |
| Dest_addr_ton | 1 | Integer | Leave default |
| Dest_addr_npi | 1 | Integer | Leave default |
| Destination_addr | <=21 | C-Octet string | MIN provided in the M-notification message from the Relay as the "To:" address. |
| Esm_class | 1 | Integer | Indicates message mode & message type. Message Mode (bits 1, 0) |
| | | | Can be set: 00 - Default ESME mode (e.g. Store and Forward) Message Type (bits 5, 4, 3, 2) |
| | | | Can be: 0000 - Default (i.e. normal message) GSM Network Specific Features (bits 7, 6): |
| | | | 00 - No specific feature selected. |
| Protocol_id | 1 | Integer | Protocol identifier for IS-95 (CDMA) should be set to NULL |
| Priority_flag | 1 | Integer | 2 (High priority) |
| Schedule_delivery_time | Fixed. Either 1 or 17 | C-Octet String | NULL for immediately message delivery. |
| Validity_period | Fixed. Either 1 or 17 | C-Octet string | NULL = ESME default |
| Registered_delivery | 1 | Integer | ESME Delivery Receipts (bits 1 and 0) |
| | | | 00 - Default: No ESME delivery receipt requested SME Originated Acknowledgement (bits 3 and 2) |
| | | | 00 - Default: No recipient SME acknowledgment requested. Intermediate Notification (bits 5): |
| | | | 0 - Default: No intermediate notification |

TABLE 7.0-continued

Submit SM Message Fields

| | | | |
|---|---|---|---|
| Replace_if_present | 1 | Integer | Flag indicating if submitted message should replace an existing message.<br>0 = Don't replace (default) |
| Data_coding | 1 | Integer | 00000010 - Octet unspecified (8-bit binary) |
| Sm_default_msg_id | 1 | Integer | Set to NULL. |
| Sm_length | 1 | Integer | Will be set to length (in octets) of the short_message user data. |
| Short_message | Variable size 0-254 | Octet String | M-notification.ind fields and values. |

HTTP Interface of the MMSC

The MMSC HTTP Server 134 accepts POST method requests (via the external Internet) encapsulating M-send.req messages (format shown in Table 3.0), which in turn encapsulate MIME multipart multimedia messages. See example 3.0.

The HTTP server 134, after receiving the MM, passes the MM to the MMS relay 122 for further processing.

The MMSC HTTP Server 134 returns POST response messages containing standard HTTP status codes and encapsulated M-send.conf messages.

The MMSC HTTP Server 134 accepts GET method requests (via the external Internet) containing the location of the MM to be retrieved. See Example 1.0.

The HTTP server 134 informs the MMS relay 122/MMS server 124 of the need to retrieve the indicated MM, after receiving the GET request.

The MMSC HTTP Server 134 sends GET responses encapsulating M-retrieve.conf messages (format as shown in Table 2.0) to the MMS UA 201, 202. Note that the m-retrieve.conf message contains the retrieved MM. See Example 2.0.

The MMS Relay HTTP Server 134 preferably supports persistent connections, and preferably includes connectivity to the external worldwide web for exchanging messages with the MMS UA 201, 202 through the wireless network 110.

SMTP Interface of the MMSC
Incoming Email

The MMS Relay SMTP Server 132 preferably supports an EHLO greeting response, but may not necessarily be required to support any specific extended SMTP commands in the EHLO response message.

The MMS Relay SMTP Server 132 supports SMTP for receiving MIME-encapsulated email content from external email servers. The MMS Relay SMTP Server 132 also maps the SMTP headers within incoming SMTP messages from external servers to the relevant MMS user agent interface message headers (See Table 8.0).

The MMS Relay SMTP Server 132 ignores SMTP headers within incoming external SMTP messages that are not necessary to populate MM1 message header fields sent to the MMS user agent.

TABLE 8.0

Email fields mapping to MM Fields

| Incoming Email Fields | MM Fields |
|---|---|
| N/A | X-mms-MessageType |
| From | From |
| Date | Date |
| To | To |
| Cc | Cc |
| Message text and attachments | Message Body |
| Content-type | Content-type |
| Subject | Subject |
| N/A | Priority |
| Content-length (Octets) | X-Mms-Message-Size |
| N/A | X-Mms-Content-Location |

Example 6.0

SMTP SEND from an Email Originator to the MMS Relay SMTP Server Destined for the MMS UA 4103036475

[Connection Initiation and Handshaking, Including 'Hello' (HELO) or 'Extended Hello' (EHLO)]
    CLIENT - MAIL FROM: demo@yahoo.com
    SERVER - 250 OK
CLIENT - RCPT TO: 4103036475@mmsc.tcsnet.net
SERVER - 250 OK
    CLIENT- DATA
    SERVER - 354 Start Mail Input
    CLIENT -
    Date: Wed, 16 May 2001 10:35:00 +0800
    From: demo@yahoo.com
    To: 4103036475@mmsc.tcsnet.net
    Subject: World leaders
        MIME Version: 1.0
Content-transfer-encoding: 7bit
Content-Type:                        multipart/mixed;
boundary=asdlfkjiurwghasf;

-continued

```
    -- asdlfkjiurwghasf
        Content-Type: text/plain
    Here is my picture of George Bush
    -- asdlfkjiurwghasf
        Content-Type: image/jpeg
        0F  0F  01  01  3A  4B  0F  0F  01  01  3A  4B  0F  0F  01
        01  3A  4B  0F  0F  01  01  3A  4B  0F  0F  01  01  3A  4B
        0F  0F  01  01  3A  4B  0F  0F  01  01  3A  4B  4B  0F  0F
        01  01  3A  4B  0F  0F  01  01  4B  0F  0F  01  01  3A  4B
        0F  0F  01  01  4B  0F  0F  01  01  3A  4B  0F  0F  01  01
        4B  0F  0F  01  01  3A  4B  0F  0F  01  01 . . .
    -- asdlfkjiurwghasf
SERVER - 250 OK
CLIENT - QUIT
SERVER - 221 Closing Transmission Channel
```

Outgoing Email

The MMS Relay SMTP server 132 may support greeting external SMTP servers with the HELO command.

The MMS Relay SMTP Server 132 maps MMS user agent interface message headers directly to SMTP mandatory message headers when an MMS User Agent 201, 202 originates an MM to be delivered via SMTP (See Table 9.0).

The MMS Relay SMTP Server 132 includes the multimedia parts of the outgoing MM as attachments, and includes the text part of the outgoing MM as the text of the email.

TABLE 9.0

MM Fields mapping to Email fields

| MM Fields | Outgoing Email Fields |
|---|---|
| X-mms-MessageType | N/A |
| From | From |
| Date | Date |
| To | To |
| Cc | Cc |
| Message Body | Message text and attachments |
| Content-type | Content-type |
| Subject | Subject |
| Priority | N/A |

MMS Relay

The MMS relay 122 maps the text priority values of the M-send.req message to numerical values (For example Low, Normal, High will be mapped to 1, 2, 3 respectively) before causing the creation of any MM notification messages.

The MMS relay 122 accepts, e.g., 10 digit MINs for person to person MM addresses, and/or any standard email address for person to email messages.

The MMS relay 122 may accept MMS addresses formatted as (MIN)@doman-name.com. In addition the MMS relay 122 may truncate the @domain-name.com in order to do MIN based routing.

The MMS relay 122 may manage the creation of M-notification.ind messages to be sent to the SMPP client 130. See Table 1.0

The MMS Relay 122 validates the MMS Address (10 digit MIN) of all MM destined for User Agent delivery by checking the Subscriber Data Store. Any unknown MIN is preferably denied service, and in the person to person delivery case, the appropriate status value error code can be sent to the originator within the M-send.conf message.

The MMS Relay 122 returns an M-retrieve.err message to the MMS User agent 201, 202 if a GET request cannot be satisfied.

MMS Server

The MMS Server 124 directs the storage and retrieval of Multimedia Messages in a non-volatile memory system 125.

The MMS Server 124 stores all MM destined for users serviced by the MMS Relay 122.

The MMS server database 125 is preferably suitably sized, e.g., preferably able to store many GB of MM data, or more.

The MMS server 124 automatically deletes expired multimedia messages. Further, the MMS server 124 preferably supports a tool for manually deleting multimedia from storage in the database by appropriate maintenance personnel.

While the invention has been described with reference to the exemplary embodiments thereof, those skilled in the art will be able to make various modifications to the described embodiments of the invention without departing from the true spirit and scope of the invention.

What is claimed is:

1. A method of sending a multimedia message, comprising:
    encapsulating, at a wireless device, a multimedia message as a multipurpose internet mail extensions (MIME) multipart message;
    addressing said MIME multipart message, via a Hyper Text Transfer Protocol (HTTP) POST command, to a multimedia messaging service center (MMSC); and
    transmitting, from said wireless device to said MMSC, said Hyper Text Transfer Protocol (HTTP) POST command including said encapsulated multimedia message through an Internet Protocol (IP) interface.

2. The method of sending a multimedia message according to claim 1, wherein:
    said Hyper Text Transfer Protocol (HTTP) POST command is addressed to a multimedia message database.

3. The method of sending a multimedia message according to claim 1, wherein said multimedia message includes at least one of the following:
    a digital image;
    a text message;
    an audio file; and
    a digital movie.

4. The method of sending a multimedia message according to claim 3, wherein:
    said digital image is a JPEG compressed image.

5. The method of sending a multimedia message according to claim 3, wherein:
    said audio file is a WAV format audio file.

6. The method of sending a multimedia message according to claim 3, wherein:
    said digital movie is a MOV format movie.

7. The method of sending a multimedia message according to claim 1, wherein:
    said multimedia message is received by a wireless device.

8. The method of sending a multimedia message according to claim 7, wherein:

said multimedia message is received by a second wireless device.

9. A wireless device for sending a multimedia message, comprising:

an encapsulator to encapsulate, at a wireless device, a multimedia message as a multipurpose internet mail extensions (MIME) multipart message;

an addressing module for addressing said MIME multipart message, via a Hyper Text Transfer Protocol (HTTP) POST command, to a multimedia messaging service center (MMSC); and a wireless transmitter for transmitting from said wireless device to said MMSC said Hyper Text Transfer Protocol (HTTP) POST command including said encapsulated multimedia message through an Internet Protocol (IP) interface.

10. The wireless device for sending a multimedia message according to claim 9, wherein:

said Hyper Text Transfer Protocol (HTTP) POST command is addressed to a multimedia message database.

11. The method of sending a multimedia message according to claim 9, wherein said multimedia message includes at least one of the following:

a digital image;
a text message;
an audio file; and
a digital movie.

12. The method of sending a multimedia message according to claim 11, wherein:

said digital image is a JPEG compressed image.

13. The method of sending a multimedia message according to claim 11, wherein:

said audio file is a WAV format audio file.

14. The method of sending a multimedia message according to claim 11, wherein:

said digital movie is a MOV format movie.

15. The method of sending a multimedia message according to claim 9, wherein:

said multimedia message is received by a wireless device.

16. The method of sending a multimedia message according to claim 15, wherein:

said multimedia message is received by a second wireless device.

* * * * *